July 11, 1967 R. MEINL 3,330,989

METHOD OF PICTURE SCANNING IN TV TUBES

Filed Dec. 17, 1963

Inventor:
Rudolf Meinl
by
Michael S. Striker
Attorney

United States Patent Office 3,330,989

Patented July 11, 1967

3,330,989

METHOD OF PICTURE SCANNING IN TV TUBES

Rudolf Meinl, Furth, Bavaria, Germany, assignor to Grundig Elektro-Mechanische Versuchsanstalt, Furth, Bavaria, Germany Filed Dec. 17, 1963, Ser. No. 331,152
Claims priority, application Germany, Feb. 23, 1963, G 37,127
6 Claims. (Cl. 315—22)

ABSTRACT OF THE DISCLOSURE

A method of picture scanning in a storage pick-up tube applicable to television cameras. Control pulses are applied to a scanning beam which scans continuously, at a predetermined speed and at a predetermined periodicity, across the storage area of a pick-up tube. The applied pulses are of a predetermined repetition frequency and cause the scanning beam to operate in a pulsating manner. The pulsed signal currents flowing during the traversal time of the scanning beam are reduced, in duration by a predetermined ratio, depending upon the duration of the traversal time period of the scanning beam. The intensity of the current signal is, at the same time, increased at approximately the same ratio.

Figure 1:
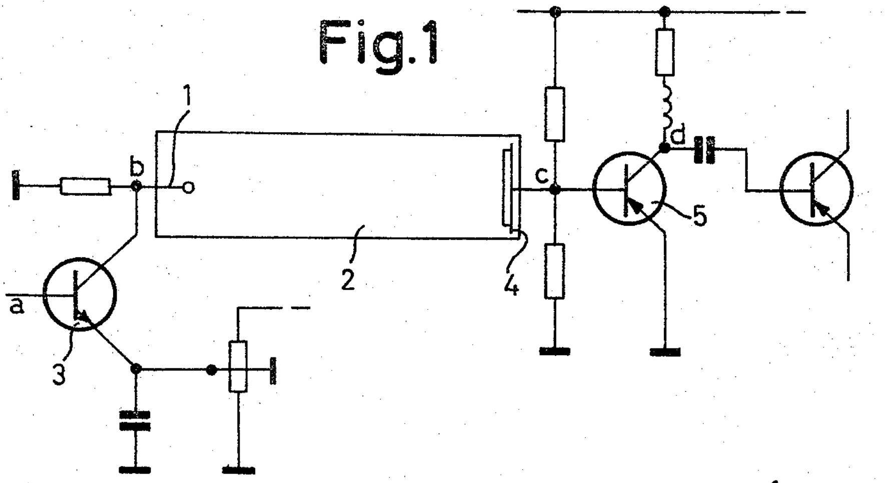

The present invention concerns the operation of television camera pick-up tubes and more specifically a method of picture scanning in a storage pick-up tube.

It is known that in television pick-up tubes of the storage type i.e. those having a charge storing layer or mosaic each element of the storage layer constitutes a small storage capacitor together with the signal plate serving as a common second electrode. For instance, in a vidicon tube the storage layer is mainly composed of photoconductive material. The signal plate is connected via an outer resistor to a point of potential which is positive relative to the cathode of the beam producing system. By scanning with the aid of a beam of comparatively slow electrons the surface of the storage layer is charged to negative potential i.e. a certain basic charge is applied thereto. If now a picture is projected onto the storage layer the local resistance at the various points of the layer is diversified and distributed in accordance with the nature of the image projected onto the layer. The negative charges applied during the scanning operation to the individual picture points is more or less dissipated until the next following scanning operation occurs. It is to be understood that in this specification a picture point is defined as that area element of the storage layer which is traversed by the scanning electron beam during one half of a period of the highest occurring signal frequency. The potential of the individual picture point changes in positive sense upon its illumination. Upon the next following scanning the charge which has been dissipated by the signal current is replaced by the energy of the electron beam. Consequently a current impulse is generated at the signal plate and is further processed as a picture signal in a well known manner by being applied to the input of a suitably connected amplifier.

It is to be borne in mind that the delivered picture signal current corresponds proportionally to the speed of the scanning beam i.e. the signal current associated with each individual picture point or area element mainly depends upon the time required for the scanning electron beam to traverse that particular picture point or area element. From this, one has to conclude that a comparatively slow scanning speed results only in a very weak signal current amounting to only a few na. (nanoamperes).

Great difficulties arise if currents of so small an amplitude are to be amplified. Although the output signal of the pick-up tube requires an amplifier having only a comparatively small band width, yet this amplifier must have a very great amplification factor and must be able also to amplify direct currents. This condition entails particularly in the case of transistor amplifiers very substantial circuit arrangements in order to stabilize the amplifier with respect to temperature influences. In addition, the input stage must be constructed in view of the low amplitude signal current in such a manner that the noise-signal ratio is low.

In view of the above it is an object of this invention to provide for a method which overcomes all the above mentioned disadvantages and difficulties.

It is another object of this invention to provide for a method as set forth which is highly effective, yet easy to carry out and entirely reliable in operation.

With above objects in view the invention includes a method of picture scanning in a storage pick-up tube, comprising the steps of causing a scanning beam to move across the area of a storage member of the tube at a predetermined speed and at a predetermined periodicity in such a manner that, if said beam is continuous, an area element of predetermined magnitude of said storage member is traversed by said scanning beam within a traversal time period of predetermined duration; applying control pulses at a predetermined pulse frequency to said scanning beam for causing a pulsating operation thereof with pulses of signal current flow occurring during said traversal time periods; and reducing the duration of said signal current flow during each of said pulses relative to said predetermined duration of said traversal time period at a ratio of $1/n$, whereby the intensity of said signal current is increased substantially in the same proportion.

Figure 2:
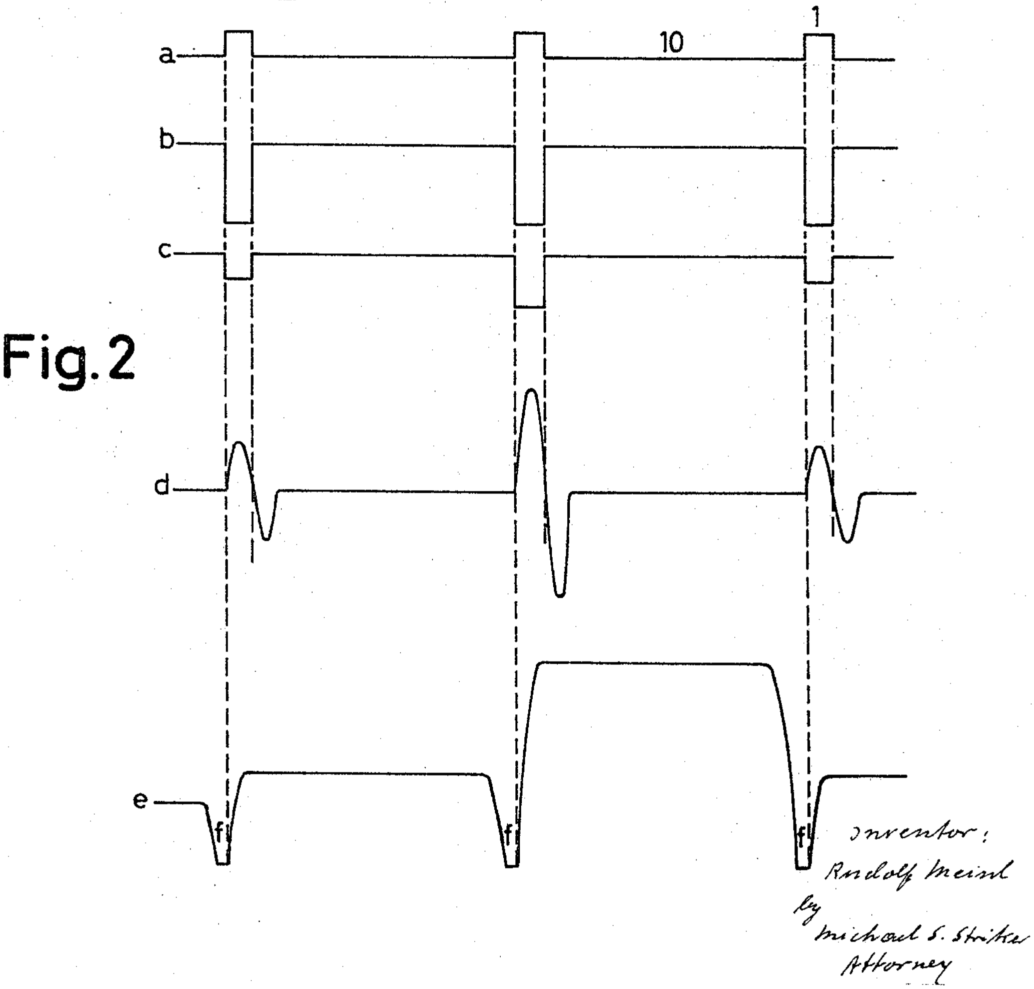

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a schematic diagram illustrating the essential components of a circuit including a storage pickup tube; and FIG. 2 is a diagram illustrating various types of impulses occurring in the execution of the method according to the invention.

As can be seen from FIG. 2 control pulses *a* of predetermined pulse duration and pulse periodicity furnished by a suitable source are applied to the electron beam in the pick-up tube 2 in order to cause pulsating operation thereof. The pulses *a* may be applied after suitable amplification in an amplifier 3 e.g. of the transistor type, to the cathode 1 of the tube 2. Consequently corresponding negative impulses *b* will appear at the cathode 1.

As a matter of principle, the duration of the pulses *a* and *b* is to be only a fraction of the duration of the above-mentioned traversal time period. Thus in the illustrated example it is assumed that the duration of the control pulses during which a signal current is permitted to flow with the electron beam is predetermined to be only 10% of the traversal time period i.e. the time required for the electron beam to traverse the above defined picture point or area element of the storage member. Now, since the intensity of the signal current $i$ is defined by the equation $$i = \frac{\Delta Q}{\Delta T}$$

wherein $\Delta Q$ represents the charge which is to be replaced by the scanning electron beam and $\Delta T$ represents the time required for replacing or reestablishing the charge per picture point. Consequently, the intensity of the signal current $i$ increases at the same ratio at which the duration of the signal current flow is reduced. In the present example where the time $\Delta T$ is limited to 10% of the traversal time period of intensity of the signal current $i$ is increased to 10 times the value it would have if the electron beam and thus the current flow would be continuous. Very satisfactory results have been obtained with a reduction ratio of 1/10. However generally it will be advisable to keep this reduction ratio below 1/5.

As a result of the conventional operation of a storage pick-up tube 2 an output signal will be furnished at the signal plate 4 which is modulated with the picture content and this output signal $c$ having correspondingly varying amplitudes is applied to an amplifier stage 5 e.g. of the transistor type. This amplifier stage 5 is constructed in a conventional manner so that the output signals $c$ are converted into corresponding waves, respectively, of substantially sine shape as indicated at $d$. The amplitude of these sine waves varies in the same manner as the amplitudes of the signals $c$. The period duration of these sine waves can be predetermined in conventional manner and is chosen in the here described example so as to amount to twice the duration of the control pulses $a$. The sine waves $d$ may be further amplified as may be necessary and are then applied to a storage circuit which operates in such a manner that the sine waves $d$ are converted into corresponding signals $e$ on account of the fact that at least one of the amplitudes of each individual sine wave signal $d$ is extended with its maximum value almost up to the start of the next following control pulse $a$ or sine wave so that the resulting output signals contain all the original signal frequencies with sufficient amplification yet without the pulse intervals characteristic of the sequence of control pulses $a$. The small gaps $f$ appearing between the actual signals can be eliminated if desired easily by using a low pass filter.

The above-described method yields the following advantages:

Due to the substantial increase of the effective signal current intensity the noise-signal ratio in the first amplifier stage has less undesirable consequences.

The individual sine wave $d$ has twice the duration of the control pulse $a$ or the corresponding output pulse $c$. The duration of these individual sine waves depends upon the ratio between the control pulse duration and the duration of the traversal time period. In the present example the duration of the sine waves $d$ amounts to one fifth of the duration of a period of the control pulses $a$.

Since the sine waves $d$ are amplitude modulated corresponding to the picture content the conditions are similar to those which are encountered in the modulation of a carrier wave. The frequency of the signals to be amplified is in the present example ten times the highest signal frequency which would occur in a conventional scanning method. Instead, this ratio 1:10 would change of course if the ratio between control pulse duration and control pulse period is different. However, it is to be noted that the modulation obtainable with the present method contains also the lowest picture signal frequency. Consequently, under no circumstances will it be necessary to transmit low frequencies.

For this reason it is also not necessary any more to provide for a direct current amplifier. It is completely satisfactory to use only an alternating current amplifier which functions in the same manner as a carrier frequency amplifier. The frequency band width to be transmitted corresponds to the ratio between pulse duration and pulse period of the control pulses $a$. For instance, if the frequency of the sine waves $d$ is 125 kilocycles and if the frequency of the control pulses $a$ is 25 kilocycles, then the amplifier would have to be suitable for transmitting a frequency band of 125 kilocycles±12.5 kilocycles. It is evident that such conditions can be met without any difficulty by using a conventional alternating current amplifier.

It is of advantage if the frequency of the control pulses $a$ is so chosen that a plurality of control pulses and consequently a corresponding plurality of signal current pulses occur during the scanning of each individual picture point i.e. during the traversal time period associated with one area element. If this is provided the information contained in the individual picture point will be processed more accurately and with greater assurance. For instance, it has been found by experiments that a control pulse frequency equal to twice the picture point frequency yields excellent results.

It will be understood that each of the elements described above, or two or more together, may also find a useful application in other types of a method of picture scanning in a storage pick-up tube differing from the types described above.

While the invention has been illustrated and described as embodied in a method of picture scanning in a storage pick-up tube including reducing the duration of the signal current flow during each of a sequence of control pulses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of picture scanning in a storage pick-up tube, comprising the steps of: causing a scanning beam to move across the area of a storage member of the tube at a predetermined speed and at a predetermined periodicity in such a manner that, if said beam is continuous, an area element of predetermined magnitude of said storage member is traversed by said scanning beam within a traversal time period of predetermined duration; applying control pulses at a predetermined pulse frequency to said scanning beam for causing a pulsating operation thereof with pulses of signal current flow occurring during said traversal time periods; and reducing the duration of said signal current flow during each of said pulses relative to said predetermined duration of said traversal time period at a ratio of smaller than 1/20, whereby the intensity of said signal current is increased substantially in the same proportion.

2. A method of picture scanning in a storage pick-up tube, comprising the steps of: causing a scanning beam to move across the area of a storage member of the tube at a predetermined speed and at a predetermined periodicity in such a manner that, if said beam is continuous, an area element of predetermined magnitude of said storage member is traversed by said scanning beam within a traversal time period of predetermined duration; applying control pulses at a predetermined pulse frequency to said scanning beam for causing a pulsating operation thereof with a plurality of pulses of signal current flow occurring during said traversal time periods; and reducing the duration of said signal current flow during each of said pulses relative to said predetermined duration of said traversal time period at a ratio of smaller than 1/20, whereby the intensity of said signal current is increased substantially in the same proportion.

3. A method of picture scanning in a storage pick-up tube, comprising the steps of: causing a scanning beam to move across the area of a storage member of the tube at a predetermined speed and at a predetermined periodicity in such a manner that, if said beam is continuous, an area element of predetermined magnitude of said storage member is traversed by said scanning beam within a traversal time period of predetermined duration; applying control pulses at a predetermined pulse frequency to said scanning beam for causing a pulsating operation thereof with pulses of signal current flow occurring during said traversal time periods; reducing the duration of said signal current flow during each of said pulses relative to said predetermined duration of said traversal time period at a ratio of $1/n$, whereby the intensity of said signal current is increased substantially in the same proportion; amplifying the picture signals delivered as amplitude-modulated pulses by said storage member during said control pulses; converting said amplitude-modulated pulses into corresponding waves, respectively, of substantially sine shape having a period amounting to a fraction of said traversal time period; and extending at least one maximum amplitude of each of said sine waves substantially until the occurrence of the next following such sine wave.

4. A method of picture scanning in a storage pick-up tube, comprising the steps of: causing a scanning beam to move across the area of a storage member of the tube at a predetermined speed and at a predetermined periodicity in such a manner that, if said beam is continuous, an area element of predetermined magnitude of said storage member is traversed by said scanning beam within a traversal time period of predetermined duration; applying control pulses at a predetermined pulse frequency to said scanning beam for causing a pulsating operation thereof with pulses of signal current flow occurring during said traversal time periods; reducing the duration of said signal current flow during each of said pulses relative to said predetermined duration of said traversal time period at a ratio of smaller than 1/20, whereby the intensity of said signal current is increased substantially in the same proportion; amplifying the picture signals delivered as amplitude-modulated pulses by said storage member during said control pulses; converting said amplitude-modulated pulses into corresponding waves, respectively, of substantially sine shape having a period amounting to a fraction of said traversal time period; and extending at least one maximum amplitude of each of said sine waves substantially until the occurrence of the next following such sine wave.

5. A method of picture scanning in a storage pick-up tube, comprising the steps of: causing a scanning beam to move across the area of a storage member of the tube at a predetermined speed and at a predetermined periodicity in such a manner that, if said beam is continuous, an area element of predetermined magnitude of said storage member is traversed by said scanning beam within a traversal time period of predetermined duration; applying control pulses at a predetermined pulse frequency to said scanning beam for causing a pulsating operation thereof with a plurality of pulses of signal current flow occurring during said traversal time periods; reducing the duration of said signal current flow during each of said pulses relative to said predetermined duration of said traversal time period at a ratio of $1/n$, whereby the intensity of said signal current is increased substantially in the same proportion; amplifying the picture signals delivered as amplitude-modulated pulses by said storage member during said control pulses; converting said amplitude-modulated pulses into corresponding waves, respectively, of substantially sine shape having a period amounting to a fraction of said traversal time period; and extending at least one maximum amplitude of each of said sine waves substantially until the occurrence of the next following such sine wave.

6. A method of picture scanning in a storage pick-up tube, comprising the steps of: causing a scanning beam to move across the area of a storage member of the tube at a predetermined speed and at a predetermined periodicity in such a manner that, if said beam is continuous, an area element of predetermined magnitude of said storage member is traversed by said scanning beam within a traversal time period of predetermined duration; applying control pulses at a predetermined pulse frequency to said scanning beam for causing a pulsating operation thereof with a plurality of pulses of signal current flow occurring during said traversal time periods; reducing the duration of said signal current flow during each of said pulses relative to said predetermined duration of said traversal time period at a ratio of smaller than 1/20, whereby the intensity of said signal current is increased substantially in the same proportion; amplifying the picture signals delivered as amplitude-modulated pulses by said storage member during said control pulses; converting said amplitude-modulated pulses into corresponding waves, respectively, of substantially sine shape having a period amounting to a fraction of said traversal time period; and extending at least one maximum amplitude of each of said sine waves substantially until the occurrence of the next following such sine wave.

References Cited

UNITED STATES PATENTS 3,130,346 4/1964 Callick ------------ 315—30 X

JOHN W. CALDWELL, *Acting Primary Examiner.*

DAVID G. REDINBAUGH, *Examiner.*

T. A. GALLAGHER, R. K. ECKERT, *Assistant Examiners.*